United States Patent
Holderman et al.

(10) Patent No.: US 10,113,104 B2
(45) Date of Patent: Oct. 30, 2018

(54) SUPERHYDROPHIC FLOW CONTROL DEVICE

(71) Applicant: HALLIBURTON ENERGY SERVICES, INC., Houston, TX (US)

(72) Inventors: Luke William Holderman, Plano, TX (US); Jean-Marc Lopez, Plano, TX (US); Liang Zhao, Plano, TX (US); Michael L. Fripp, Carollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 579 days.

(21) Appl. No.: 14/398,151

(22) PCT Filed: Nov. 25, 2013

(86) PCT No.: PCT/US2013/071703
§ 371 (c)(1),
(2) Date: Oct. 31, 2014

(87) PCT Pub. No.: WO2015/076844
PCT Pub. Date: May 28, 2015

(65) Prior Publication Data
US 2016/0264856 A1    Sep. 15, 2016

(51) Int. Cl.
*E21B 43/12* (2006.01)
*C09K 8/80* (2006.01)
(Continued)

(52) U.S. Cl.
CPC .............. *C09K 8/805* (2013.01); *C09D 1/00* (2013.01); *C09D 125/06* (2013.01); *E21B 17/22* (2013.01); *E21B 43/04* (2013.01); *E21B 43/08* (2013.01); *E21B 43/12* (2013.01); *E21B 43/14* (2013.01); *E21B 43/267* (2013.01)

(58) Field of Classification Search
CPC ........ E21B 43/12; E21B 43/267; E21B 43/08; E21B 43/04; E21B 43/14; E21B 17/22
See application file for complete search history.

(56) References Cited

U.S. PATENT DOCUMENTS

| 2009/0301726 A1* | 12/2009 | Coronado | E21B 34/08 166/319 |
| 2011/0079384 A1* | 4/2011 | Russell | E21B 43/12 166/228 |

(Continued)

FOREIGN PATENT DOCUMENTS

| CN | 101074601 | 11/2007 |
| CN | 102482937 | 5/2012 |

OTHER PUBLICATIONS

International Patent Application No. PCT/US2013/071703, International Search Report and Written Opinion dated Aug. 22, 2014, 16 pages.

(Continued)

*Primary Examiner* — George S Gray
(74) *Attorney, Agent, or Firm* — Kilpatrick Townsend & Stockton LLP (57) ABSTRACT

A wellbore subassembly includes a device having a production flow path toward a production tubing. The production flow path can include a superhydrophobic coating for restricting the production of an unwanted fluid towards the production tubing.

6 Claims, 7 Drawing Sheets

(51) Int. Cl.
*E21B 43/04* (2006.01)
*E21B 43/14* (2006.01)
*C09D 1/00* (2006.01)
*C09D 125/06* (2006.01)
*E21B 17/22* (2006.01)
*E21B 43/08* (2006.01)
*E21B 43/267* (2006.01)

(56) References Cited

U.S. PATENT DOCUMENTS

| | | | |
|---|---|---|---|
| 2012/0048547 A1 | 3/2012 | Hughes et al. | |
| 2013/0048081 A1* | 2/2013 | Agrawal | E21B 43/12 |
| | | | 137/1 |
| 2013/0081812 A1* | 4/2013 | Green | C09K 8/805 |
| | | | 166/280.1 |
| 2013/0161018 A1 | 6/2013 | Fripp et al. | |
| 2013/0292118 A1 | 11/2013 | Nguyen | |
| 2014/0162022 A1* | 6/2014 | Nowak | C09D 5/00 |
| | | | 428/145 |
| 2014/0216754 A1* | 8/2014 | Richard | E21B 43/08 |
| | | | 166/373 |

OTHER PUBLICATIONS

Moaven et al., "Experimental investigation of viscous drag reduction of superhydrophobic nano-coating in laminar and turbulent flows", Experimental Thermal and Fluid Science, vol. 51 (2013), pp. 239-243.
Australian Patent Application No. 2013405883, First Examiner Report, dated May 27, 2016, 3 pages.
Chinese Patent Application No. 2013800801376, Office Action, dated Dec. 22, 2016, 17 pages.

* cited by examiner

SUPERHYDROPHIC FLOW CONTROL DEVICE

CROSS-REFERENCE TO RELATED APPLICATIONS

This is a U.S. national phase under 35 U.S.C. 371 of International Patent Application No. PCT/US2013/071703, titled "Superhydrophobic Flow Control Device" and filed Nov. 25, 2013, the entirety of which is incorporated herein by reference.

TECHNICAL FIELD

The present disclosure relates generally to flow control devices for a wellbore and, more particularly (although not necessarily exclusively), to a flow control device having a superhydrophobic surface that can affect fluid flow.

BACKGROUND

Various devices can be installed in a well traversing a hydrocarbon-bearing subterranean formation. Some devices control the flow rate of fluid between the formation and tubing, such as production or injection tubing. An example of these devices is a flow control device that can control the flow rate of various fluids into the tubing.

DETAILED DESCRIPTION

Certain aspects and features relate to flow control devices with a surface coated with a superhydrophobic material that can control the flow rate of fluid between the formation and tubing. The superhydrophobic material on a surface can change a velocity profile of a fluid contacting the surface. For example, fluid with a greater concentration of a desired or wanted fluid, such as oil, can flow with a higher velocity along a superhydrophobic-coated surface. Fluid with a greater concentration of an undesired or unwanted fluid, such as natural gas or water, can flow with a lower velocity along a superhydrophobic-coated surface.

Flow control devices according to some aspects can include a helical flow control device having a tubing with an inner surface that is coated with a superhydrophobic material. Some fluids, such as oil, can have a high surface tension. The high surface tension can increase the contact angle between the superhydrophobic-coated inner surface and oil as compared to the contact angle between oil and an uncoated inner surface of a tubing. The increased contact angle results in less surface contact between oil and the superhydrophobic-coated inner surface compared to the surface contact between oil and an uncoated inner surface. The decreased surface contact between the superhydrophobic-coated inner surface and oil can decrease the frictional resistance experienced by oil flowing along the superhydrophobic-coated inner surface. The velocity profile of oil flowing along the superhydrophobic-coated inner surface can increase when the frictional drag is decreased. The velocity profile of a fluid having a greater concentration of oil flowing along the superhydrophobic-coated inner surface can also increase as the frictional drag is decreased. The increase in the velocity profile of the fluid having a greater concentration of oil can promote the production of that fluid, and thereby oil, through an inner diameter of the helical flow control device.

Other fluids can have a lower surface tension than oil. For example, natural gas can have almost no surface tension. The low surface tension of natural gas can cause a large surface area of natural gas to contact the superhydrophobic-coated inner surface of the tubing. The large surface area of contact between natural gas and the superhydrophobic-coated inner surface can cause natural gas flowing along the superhydrophobic-coated inner surface to experience a high frictional resistance between it and the superhydrophobic-coated inner surface, which can cause the natural gas to experience a higher flow resistivity. The higher flow resistivity can decrease the velocity of natural gas flowing across the superhydrophobic-coated inner surface. Fluids having a greater concentration of natural gas can also experience a decrease in velocity as it flows along the superhydrophobic-coated inner surface. The lower velocity of the fluid having a greater concentration of natural gas can damper or restrict the production of the fluid, and thereby natural gas, through the helical flow control device.

Other fluids, such as water, can also experience either restriction or promotion as they flow through the helical flow control device. For example, features of the helical flow control device having an inner surface that is coated with a superhydrophobic material can be altered to restrict the flow of other fluids, such as water. For example, the size of the tube of the helical flow device can be altered to more greatly restrict a first type of fluid, such as natural gas, and to restrict less a second type of fluid, such as water or steam.

Flow control devices according to some aspects can include a gravel pack assembly with proppants coated with a superhydrophobic material. Some fluids, such as oil, can experience a lower surface area contact with the superhydrophobic-coated surface of the proppants, compared to the surface area contact with uncoated proppants. The decrease in the surface area contact can cause the velocity profile of oil, and fluid having a greater concentration of oil, to increase as the fluid passes through the coated proppants towards the production tubing. The increase in the velocity of the fluid having a greater concentration of oil can promote the production of the fluid towards the production tubing.

Other fluids, such as natural gas, can experience an increase in frictional resistance between it and the superhydrophobic-coated surface of the proppants, compared to the frictional resistance between it and uncoated proppants. The increase in frictional resistance can cause the velocity profile of natural gas, and fluids having a greater concentration of natural gas, to decrease as the fluids pass through the coated proppants towards a production tubing. The decrease in the velocity of fluids having a greater concentration of natural gas can damper the production of the fluids towards a production tubing.

Superhydrophobic material can be a material that repels water at a contact angle that exceeds one hundred and fifty degrees. Super hydrophobia can also be referred to as the Lotus effect. Superhydrophobic material can include nano-composites. Examples of superhydrophobic material can include manganese oxide polystyrene, zinc oxide polystyrene, precipitated calcium carbonate, carbon nano-tube structures, and silica-based nano-coating.

These illustrative examples are given to introduce the reader to the general subject matter discussed here and are not intended to limit the scope of the disclosed concepts. The following sections describe various additional embodiments and examples with reference to the drawings in which like numerals indicate like elements, and directional descriptions are used to describe the illustrative embodiments but, like the illustrative embodiments, should not be used to limit the present invention.

Figure 1:
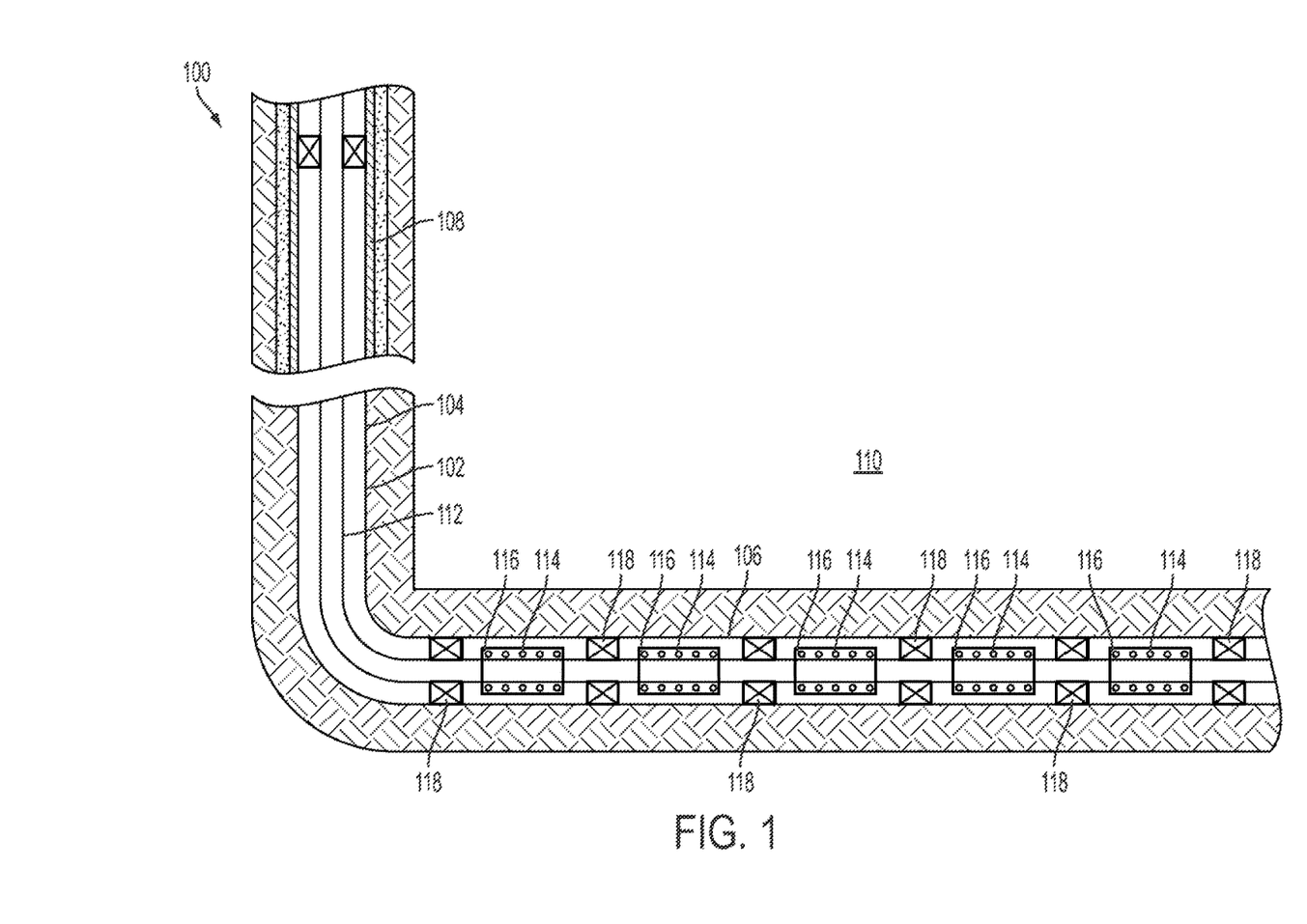
FIG. 1 is a schematic illustration of a well system having helical flow control devices with a functionalized surface that can include a superhydrophobic material according to one aspect.

FIG. 1 depicts a well system 100 having helical flow control devices 114 that include superhydrophobic material in an inner wall of the helical flow control devices 114 according to certain aspects. The well system 100 includes a bore that is a wellbore 102 extending through various earth strata. The wellbore 102 has a substantially vertical section 104 and a substantially horizontal section 106. The substantially vertical section 104 and the substantially horizontal section 106 may include a casing string 108 cemented at an upper portion of the substantially vertical section 104. The substantially horizontal section 106 extends through a hydrocarbon bearing subterranean formation 110.

A tubing string 112 extends from the surface into the wellbore 102. The tubing string 112 can provide a conduit for formation fluids to travel from the substantially horizontal section 106 to the surface. Helical flow control devices 114 and production tubular sections 116 in various production intervals adjacent to the formation 110 are positioned around the tubing string 112. On each side of each production tubular section 116 is a packer 118 that can provide a fluid seal between the tubing string 112 and the wall of the wellbore 102. Each pair of adjacent packers 118 can define a production interval.

Helical flow control devices 114 can allow for control over the volume and composition of produced fluids. Formation fluid flowing into a production tubular section 116 may include more than one type of fluid, such as natural gas, oil, water, steam and carbon dioxide. "Natural gas" as used herein means a mixture of hydrocarbons (and varying quantities of non-hydrocarbons) that exists in a gaseous phase at room temperature and pressure and in a liquid phase or gaseous phase in a downhole environment. Steam and carbon dioxide can be used as injection fluids to cause hydrocarbon fluid to flow toward a production tubular section 116. Natural gas, oil, and water be found in the formation 110.

A helical flow control device 114 according to some embodiments can reduce or restrict production of formation fluid having a greater concentration of an unwanted fluid and can promote the production of fluid having a greater concentration of a wanted fluid. For example, the helical flow control devices 114 may autonomously restrict or resist production of formation fluid having a greater concentration of unwanted fluid, such as natural gas, water or steam, from a production interval. The helical flow control device 114 can also promote the production of formation fluid having a greater concentration of a wanted fluid, such as oil, from a production interval. For example, the helical flow control device 114 can include superhydrophobic material on an inner wall that can cause the helical flow control device 114 to promote or restrict the flow of formation fluid based on one or more properties of the formation fluid.

Although FIG. 1 depicts the helical flow control devices 114 positioned in the substantially horizontal section 106, the helical flow control devices 114 (and production tubular sections 116) can be located, additionally or alternatively, in the substantially vertical section 104. Furthermore, any number of the helical flow control devices 114, including one, can be used in the well system 100 generally or in each production interval. In other aspects, the helical flow control devices 114 can be positioned in simpler wellbores, such as wellbores having only a substantially vertical section. The helical flow control devices 114 can be positioned in open hole environments, such as is depicted in FIG. 1, or in cased wells.

Figure 2:
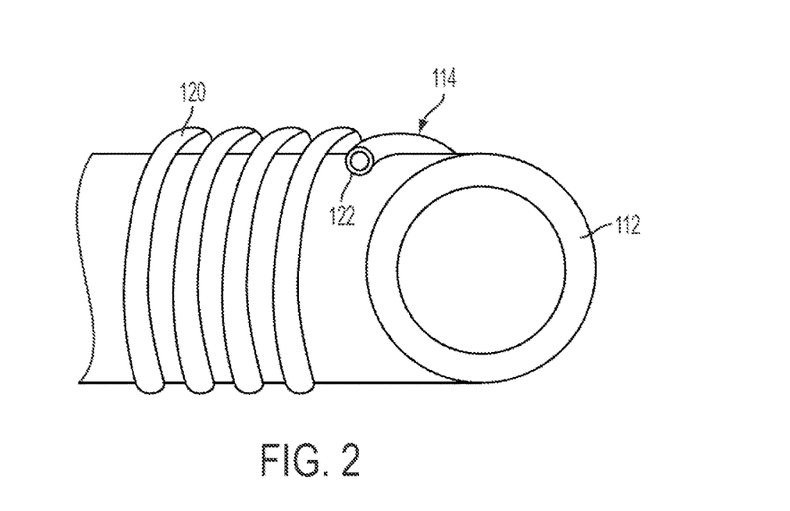
FIG. 2 is a perspective view of a helical flow control device positioned around a tubing string according to one aspect.

FIG. 2 depicts perspective view of a helical flow control device 114 positioned around the tubing string 112 according to one aspect. The helical flow control device 114 includes tubing 120 having an inner wall 122. The inner wall 122 may be any shape, including rectangular. The inner wall can be coated with a superhydrophobic material. The length along the tubing string 112 that the tubing 120 extends can vary. For example, the coils of the tubing 120 that wrap around the tubing string 112 can be positioned closely together, so the tubing 120 extends a short distance along the length of the tubing string 112. In another example, the coils of the tubing 120 can be spaced farther apart, so the tubing 120 extends a greater distance along the length of the tubing string 112.

Figure 3:
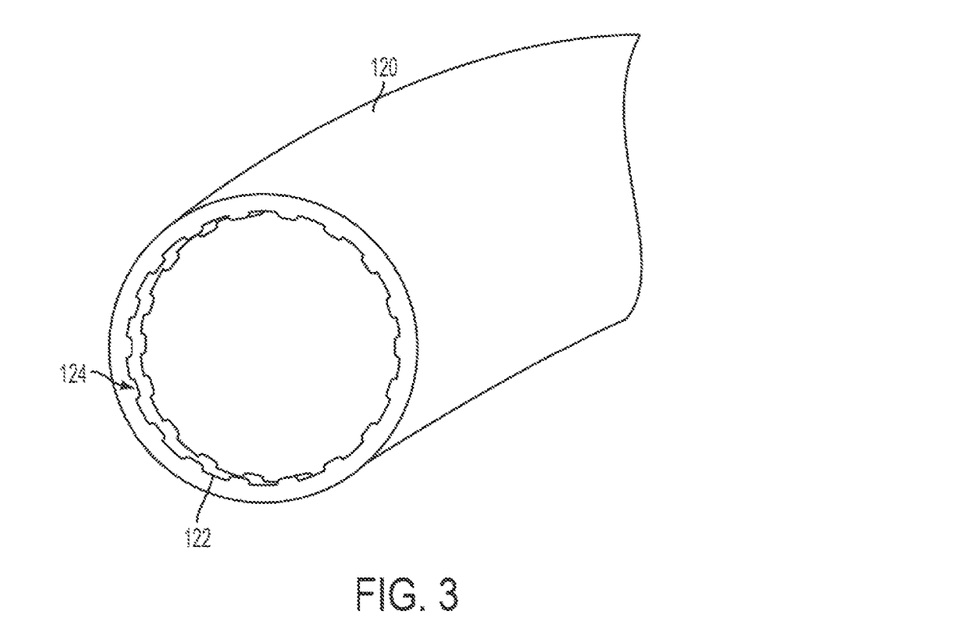
FIG. 3 is an end view of the helical flow control device of FIG. 2 that includes superhydrophobic material according to one aspect.

FIG. 3 depicts an end view of the helical flow control device 114 of FIG. 2 that includes a superhydrophobic material 124. The inner wall 122 of the tubing 120 of the helical flow control device 114 is coated with the superhydrophobic material 124. The superhydrophobic material 124 can overlay the inner wall 122 or be embedded within the inner wall 122. The superhydrophobic material 124 can be on an entire circumferential portion of the inner wall 122 or on only part of the inner wall 122. The superhydrophobic material 124 can be screen-printed or otherwise overlaid on the inner wall 122. In one aspect, the superhydrophobic material 124 is bonded to the inner wall 122 by an adhesive or mechanical coupler. In one aspect, the superhydrophobic material 124 can include a nano-structure material that is uniform along the x and y axis of the inner wall 122.

The superhydrophobic material 124 can allow the helical flow control device 114 to promote or restrict the flow of fluid based on one or more properties of the fluid. For example, the superhydrophobic material 124 can increase the contact angle, and thereby decrease the surface area contact, between the superhydrophobic material 124 and fluid having a greater concentration of oil. The decrease in the surface area contact between the fluid having a greater concentration of oil and the superhydrophobic material 124 can decrease the frictional drag experienced by the fluid as it flows across the superhydrophobic material on the inner wall 122. The velocity profile of fluid having a greater concentration of oil as it flows across the superhydrophobic material 124 on the inner wall 122 can increase when the frictional drag is decreased. The increase in the velocity profile of fluid having a greater concentration of oil can promote the production of the fluid through the helical flow control device 114 towards a production tubing.

Other fluids, however, can experience a decreased velocity profile when flowing along the superhydrophobic material 124 on the inner wall 122. For example, natural gas can experience an increase in frictional resistance when it contacts the superhydrophobic material 124, as compared to its contact with an uncoated surface. The increase in frictional resistance can decrease the velocity of a fluid having a greater concentration of natural gas flowing across the superhydrophobic material 124 on the inner wall 122. The decreased velocity of the fluid having a greater concentration of natural gas flowing along the inner wall 122 can damper the production of the fluid through the helical flow control device 114 towards a production tubing.

Other fluids, such as water, can also experience a decreased velocity profile when flowing along the superhydrophobic material 124 on the inner wall 122. The superhydrophobic-coated tubing 120 of the helical flow control device 114 can increase the frictional drag experienced by water flowing along the inner wall 122 while decreasing the frictional drag experienced by oil flowing along the inner wall 122.

In another aspect, additional surfaces that are part of a flow path to a production tubing can be coated with a superhydrophobic material. For example, sand control screen assemblies can be coated with a superhydrophobic material.

Figure 4:
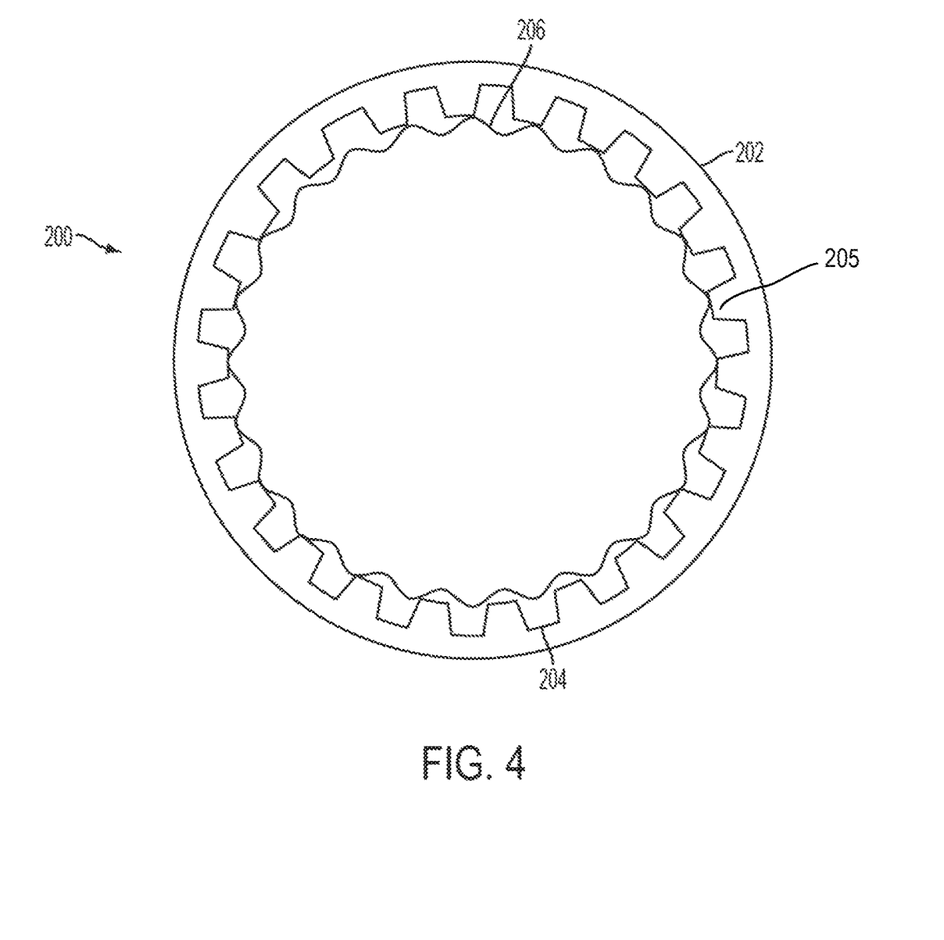
FIG. 4 is a cross-sectional view depicting an example of a fluid having a greater concentration of a wanted fluid contacting an inner wall of a helical flow control device coated with a superhydrophobic material, the inner wall having a plurality of protrusions, according to one aspect.

FIG. 4 depicts a cross-sectional view of an example of a helical flow control device 200 that includes tubing 202 that has a superhydrophobic-coated inner wall 204 and a fluid 206 having a greater concentration of a wanted fluid flowing within an inner diameter of the tubing 202. The superhydrophobic-coated inner wall 204 of the tubing 202 can include projections 205 that extend towards an inner region of the tubing 202 for increasing a surface area of the super-hydrophobic coated inner wall 204. In some aspects, the superhydrophobic-coated inner wall 204 may have more or fewer projections 205 than is shown in FIG. 4. The fluid 206 that flows within the inner diameter of the tubing 202 can experience a decrease in frictional drag with the superhydrophobic-coated inner wall 204. The decrease in frictional drag can increase the velocity of the fluid 206 along the superhydrophobic-coated inner wall 204 of the tubing 202. The increased velocity of fluid 206 having a greater concentration of the wanted fluid flowing within the inner diameter of the tubing 202 can promote the production of the fluid 206 having a greater concentration of the wanted fluid through the helical flow control device 200 towards a production tubing. In one aspect, the wanted fluid can be oil.

Figure 5:
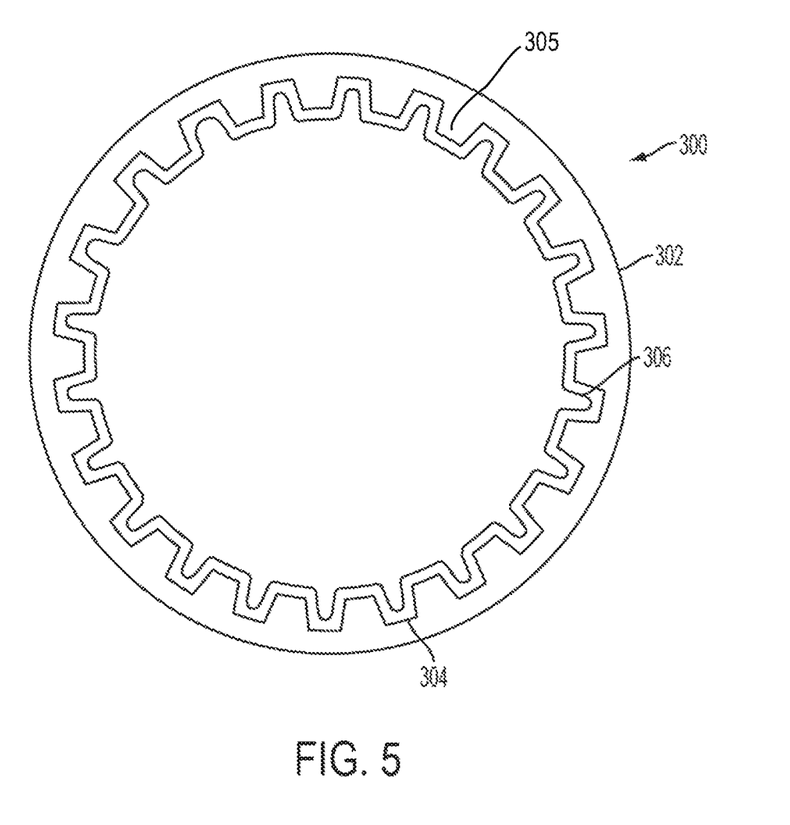
FIG. 5 is a cross-sectional view depicting an example of a fluid having a greater concentration of an unwanted fluid contacting an inner wall of a helical flow control device coated with a superhydrophobic material, the inner wall having a plurality of protrusions, according to one aspect.

FIG. 5 depicts a cross-sectional view of a helical flow control device 300 that includes tubing 302 that has a superhydrophobic-coated inner wall 304 a fluid 306 having a greater concentration of an unwanted fluid flowing within an inner diameter of the tubing 302. The superhydrophobic-coated inner wall 304 of the tubing 302 can include projections 305 that extend towards an inner region of the tubing 302 for increasing a surface area of the super-hydrophobic coated inner wall 304. In some aspects, the superhydrophobic-coated inner wall 304 may have more or fewer projections 305 than is shown in FIG. 5. The fluid 306 that flows within the inner diameter of the tubing 302 has a large surface area of contact between it and the superhydrophobic-coated inner wall 304. The large surface area of contact can increase the frictional resistance between the fluid 306 and the superhydrophobic-coated inner wall 304. The increase in frictional resistance can decrease the velocity of the fluid 306 flowing along the superhydrophobic-coated inner wall 304 of the tubing 302. The decrease in the velocity of the fluid 306 flowing within the inner diameter of the tubing 302 can damper the production of the fluid 306 having a greater concentration of the unwanted fluid through the helical flow control device 300 towards a production tubing. In one aspect, the unwanted fluid can be one or more of water, natural gas, or steam.

Figure 6:
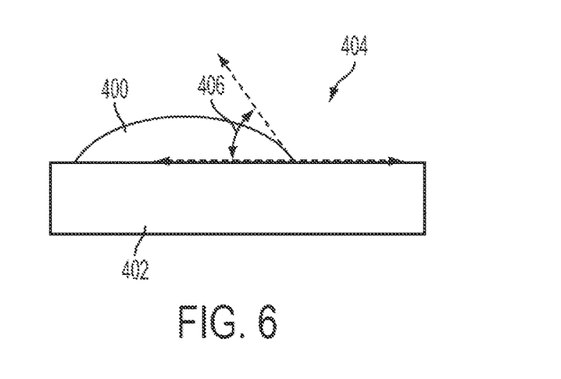
FIG. 6 is a side view of an example of a contact angle between a droplet of a liquid and a solid surface with a superhydrophobic material according to one aspect.

FIG. 6 depicts a side view of an example of a contact angle between a liquid droplet 400 and a superhydrophobic solid surface 402. The liquid droplet 400 rests on a superhydrophobic solid surface 402 and is surrounded by a gas 404. The contact angle 406 is formed by the liquid droplet 400 at the three-phase boundary where the liquid droplet 400, the gas 404, and the solid surface 402 intersect. In one aspect, a superhydrophobic surface can be defined as a surface in which the contact angle between the solid surface 402 and a droplet of water exceeds one hundred and fifty degrees. As the contact angle between the liquid droplet 400 and the solid surface 402 increases, the surface area contact between the liquid droplet 400 and the solid surface 402 decreases.

Figure 7:
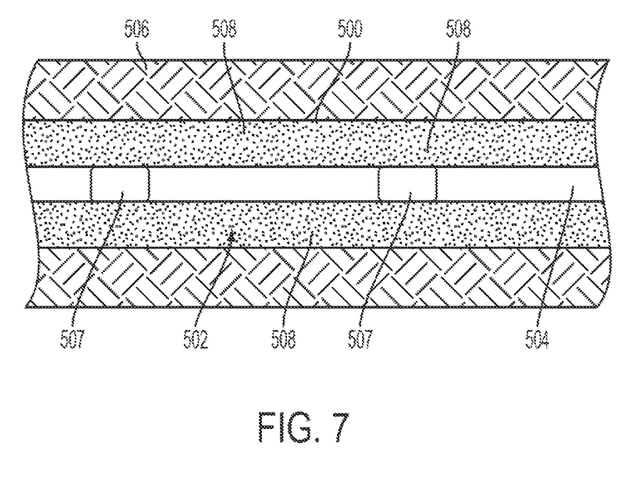
FIG. 7 is a cross-sectional view of part of a well system having a gravel pack that includes proppants coated with a superhydrophobic material according to one aspect.

FIG. 7 depicts a cross-sectional view of part of a well system with a flow control device that includes a gravel pack 502 installed between a tubing string 504 and a formation 506. The tubing string 504 can provide a conduit for formation fluids to travel from the formation 506 to the surface. The tubing string 504 also includes additional flow control devices 507. The gravel pack 502 includes proppants 508. The proppants 508 are coated with a superhydrophobic material. The coated proppants 508 can allow for control over the volume of produced fluids. For example, the coated proppants 508 can autonomously restrict or resist production of formation fluid having a greater concentration of unwanted fluid, such as natural gas or water. For example, as formation fluid having a greater concentration of natural gas, flows from the formation 506 through the coated proppants 508, the formation fluid can experience an increase in frictional resistance between it and the coated proppants 508. The increase in frictional resistance can slow the velocity of the formation fluid through the spaces between the proppants 508 of the gravel pack 502. The decrease in velocity of the formation fluid flowing through the gravel pack 502 can limit the amount of formation fluid having a greater concentration of natural gas entering the tubing string 504 from the formation 506. The formation fluid can enter the tubing string 504 via the flow control devices 507.

The coated proppants 508 can also autonomously promote the production of fluid having a greater concentration of a wanted fluid, such as oil. As formation fluid having a greater concentration of oil flows from the formation through the coated proppants 508, the formation fluid can experience a decrease in frictional resistance between it and the coated proppants 508. The decrease in frictional resistance can increase the velocity of the formation fluid having a greater concentration of oil through the spaces between the proppants 508 of the gravel pack 502. The increase in the velocity of the formation fluid as it moves through the gravel pack 502 can increase the amount of formation fluid having a greater concentration of oil entering the tubing string 504 from the formation 506. The formation fluid can enter the tubing string 504 via the flow control devices 507. In one aspect, the flow control devices 507 can be coated with a superhydrophobic material.

The gravel pack 502 can be installed within the wellbore by pumping the coated proppants 508 downhole along the length of the wellbore. The coated proppants 508 can have a decreased frictional resistance between the coated proppants 508 and the wellbore 500 and the tubing string 504. The decrease in friction between the coated proppants 508 and the wellbore 500 and the tubing string 504 can aid in the installation of the gravel pack along long intervals within the wellbore.

In one aspect, a wellbore subassembly can include a device having a production flow path toward a production tubing. The production flow path can include a superhydrophobic coating for restricting the production of an unwanted fluid towards the production tubing.

In one aspect, a wellbore subassembly can include a tube positioned external to a production tubing. The tube can have an inner wall that includes a superhydrophobic material for restricting production of an unwanted fluid toward the production tubing.

In another aspect, a wellbore subassembly can include a gravel pack with proppants. The proppants of the gravel back can be positioned between a production tubing and a wellbore. The proppants can be coated with a superhydrophobic material for restricting production of an unwanted fluid toward the production tubing.

The foregoing description of certain aspects, including illustrated aspects, has been presented only for the purpose of illustration and description and is not intended to be exhaustive or to limit the disclosure to the precise forms disclosed. Numerous modifications, adaptations, and uses thereof will be apparent to those skilled in the art without departing from the scope of this disclosure.

What is claimed is:

1. A wellbore subassembly, comprising:
   a flow control device having a helical enclosed production flow path toward a production tubing, the helical enclosed production flow path being positioned circumferentially about the production tubing, wherein the helical enclosed production flow path includes a superhydrophobic coating on an inner surface of the helical enclosed production flow path for restricting production of an unwanted fluid toward the production tubing, the superhydrophobic coating having a contact angle with a water droplet in the unwanted fluid that exceeds 150°, and wherein the superhydrophobic coating is operable for increasing a velocity of fluid having a greater concentration of oil flowing along the production flow path, wherein the inner surface of the helical enclosed production flow path has a plurality of protrusions.

2. The wellbore subassembly of claim 1, wherein the unwanted fluid has a greater concentration of at least one of water or natural gas or steam than a wanted fluid.

3. The wellbore subassembly of claim 1, wherein the superhydrophobic coating is overlaid on a surface of the helical production flow path.

4. The wellbore subassembly of claim 1, wherein the superhydrophobic coating includes at least one of manganese oxide polystyrene, zinc oxide polystyrene, precipitated calcium carbonate, carbon nano-tube structures, or silica-based nano-coating.

5. The wellbore subassembly of claim 1, wherein the device is part of a sand control screen assembly.

6. The wellbore subassembly of claim 1 further comprising:
   a gravel pack comprising a plurality of proppants positioned between the production tubing and a wellbore, the plurality of proppants coated with a second superhydrophobic material for restricting production of an unwanted fluid toward the production tubing, wherein the second superhydrophobic material has a contact angle with a water droplet in the unwanted fluid that exceeds 150°, and
   wherein the second superhydrophobic material includes at least one of manganese oxide polystyrene, zinc oxide polystyrene, carbon nano-tube structures, or silica-based nano-coating.

\* \* \* \* \*